United States Patent [19]

Culross et al.

[11] Patent Number: 5,074,990

[45] Date of Patent: Dec. 24, 1991

[54] FLUID CATALYTIC CRACKING USING CATALYSTS CONTAINING AN ALUMINA-ON-SILICA COMPONENT

[75] Inventors: Claude C. Culross; Gordon F. Stuntz; William E. Winter, all of Baton Rouge, La.

[73] Assignee: Exxon Research and Engineering Company, Florham Park, N.J.

[21] Appl. No.: 543,503

[22] Filed: Jun. 25, 1990

Related U.S. Application Data

[63] Continuation-in-part of Ser. No. 288,898, Dec. 23, 1988, abandoned, which is a continuation-in-part of Ser. No. 114,835, Oct. 30, 1987, abandoned.

[51] Int. Cl.$^5$ .............................................. C10G 11/04
[52] U.S. Cl. ...................................... 208/120; 502/64; 502/263
[58] Field of Search ................... 208/120; 502/64, 263

[56] References Cited

U.S. PATENT DOCUMENTS

| | | | |
|---|---|---|---|
| 2,745,812 | 5/1956 | Ries | 208/120 |
| 3,118,845 | 1/1964 | Innes et al. | 502/263 |
| 3,158,565 | 11/1964 | Sanford et al. | 208/120 |
| 3,242,069 | 3/1966 | Gladrow et al. | 208/120 |
| 3,274,120 | 9/1966 | Aftandilian | 502/263 |
| 3,502,595 | 3/1970 | Johnson et al. | 502/263 |
| 4,115,249 | 9/1978 | Blanton, Jr. et al. | 208/120 |

*Primary Examiner*—Anthony McFarlane
*Attorney, Agent, or Firm*—Henry E. Naylor; Penny Prater

[57] ABSTRACT

Disclosed is a fluid catalytic cracking process using a catalyst composite comprised of an alumina-on-silica material, an inorganic refractory oxide, and optionally a zeolite material. The alumina-on-silica material is comprised of silica particles with surface bound aluminum groups chemically bonded to the silica surface through surface oxygen atoms, which material is dispersed in a matrix of a refractory oxide.

16 Claims, No Drawings

FLUID CATALYTIC CRACKING USING CATALYSTS CONTAINING AN ALUMINA-ON-SILICA COMPONENT

CROSS REFERENCE TO RELATED APPLICATIONS

This is a Continuation-in-Part application of U.S. Ser. No. 288,898, filed Dec. 23, 1988, now abandoned, which is a Continuation-in-Part application of U.S. Ser. No. 114,835, filed Oct. 30, 1987 and abandoned on Nov. 38, 1989.

FIELD OF THE INVENTION

Fluid catalytic cracking (FCC) is one of the most widely used refinery processes for converting heavy oils into more valuable gasoline and lighter products. Wherever there is a rapidly growing demand for gasoline, FCC is the cheapest and fastest route to obtain this premium priced product. Consequently, much work has been done through the years to improve the yield and/or octane rating of the FCC product slate. Paramount in improving the FCC yield and product slate are the cracking catalysts employed. While commercial cracking catalysts include acid-treated natural aluminosilicates, amorphous synthetic silica-alumina combinations, and crystalline synthetic silica-alumina (zeolites), the most widely used commercial fluid catalytic cracking catalysts are the zeolites. While zeolites for FCC have met with a very high degree of success, they are nevertheless limited by their respective pore sizes as to which hydrocarbon molecules can reach the active acid sites, the 7.4 Angstrom pore mount of Y-faujasite being typical of the upper end of this pore size restriction. Furthermore, there is a tie between a zeolite of a particular structure and the aluminum content range of that zeolite. In certain limited cases, it is not possible to obtain a particular aluminum content in a specific zeolite structure. Each where this is not the case, it is not uncommon that one must employ chemical dealumination schemes subsequent to synthesis to obtain the specific aluminum content or other property that one desires. As a result, considerable effort has been expended to develop catalysts comprising either a naturally occurring or synthetic zeolite having, firstly, the desires cracking activity; secondly, pore sizes which will permit access to the acid sites of those hydrocarbon molecules sought to be cracked, and; thirdly, an expanded aluminum content range. To date, research has been unable to increase pore sizes beyond the 7–8 Angstrom range, and inroads into expanding the aluminum content range have been limited.

Generally, catalysts of this type are used in compositions frequently containing an "inert" matrix which will reduce cracking activity to a controlled level and which produces useful products; e.g., transportation fuels from the FCC process. Catalyst compositions of this type are taught in U.S. Pat. No. 4,289,606 and the patents and other references therein cited.

A further limitation is encountered in the use of composite catalysts in the aforementioned FCC process relating to by-product coke deposited on the catalyst. The catalyst becomes deactivated by the deposition of coke, and must be reactivated by burning the coke off the catalyst. The heat produced by burning is useful in that this is used to bring the feed to process temperature, and it counteracts the innate endothermicity of cracking reactions. However, it is generally the case that more coke is produced than is needed to heat balance the process, and since heat balance is the controlling parameter, catalyst is necessarily recycled in a partially deactivated form; i.e., containing residual coke. This situation is exacerbated by the progressively heavier nature of today's FCC feeds which are prone to making higher levels of coke. Thus, the need for a catalyst which makes less coke is clear. In addition, there is the need for catalysts which are more stable to the harsh conditions found in the regenerator (600° C–800° C. under steam partial pressure). The steam changes the catalyst in a number of ways, perhaps the most important of which is to remove aluminum from the zeolite, thereby deactivating the zeolite by reducing the number of acid sites. Manifestly, there is also a need for catalysts with higher steam stability.

More recently, it has been discovered that synthetic, amorphous silica-alumina compounds, having the capability to catalyze conversion of oxygen-containing hydrocarbons, such as methanol to aromatic hydrocarbons such as toluene, can be prepared. Such a catalyst composition is taught in published U.K. Application No. 2,132,585A. This particular catalyst does not, however, exhibit significant cracking activity. Even more recently, it has also been discovered that the number of acidic sites in a crystalline silica-alumina catalyst, such as a synthetic zeolite, can be increased by coating the zeolite with alumina. Catalysts of this type are taught in published European Patent Application No. 0,184,305. Such catalysts, however, do not afford an opportunity to control cracking activity over a broad range of acid sites since the minimum activity is controlled by the activity of the zeolite initially selected. Furthermore, the maximum activity is quickly reached as the importance of the number of sites becomes outweighed by the lower activity of each site which results from closer site proximity. Moreover, the cracking activity of catalyst of the type taught in European Patent Application 0,184,305 is, to a large extent, controlled by the relatively small pore size of the ASM-5 zeolite initially selected for coating with alumina.

From the foregoing, and as is believed well known in the prior art, synthetic zeolite catalysts in composite with inert matrices have a controlled activity level that produces the desired product slate(s) in conventional commercial processes, but they suffer four drawbacks. Firstly, they are restricted as to the molecular weight of hydrocarbon compounds which can be cracked owing to the pore size thereof. Secondly, there are crystalline constraints on elemental composition; i.e., the aluminum content range which is available with a zeolite of a specific structure is limited, and a specific aluminum content can sometimes be achieved only subsequent to synthesis by a separate chemical dealumination step. Thirdly, incompletely regenerated catalysts must necessarily be recycled in processes such as FCC because the amount of coke made exceeds that which is needed to heat balance the process. Fourthly, zeolites are subject to structural degradation by reaction with high temperature steam which is a by-product of regeneration.

SUMMARY OF THE INVENTION

In accordance with the present invention, there is provided a fluid catalytic cracking process which comprises contacting, at fluid catalytic cracking conditions, a hydrocarbonaceous feed with a catalyst composite comprised of an alumina-on-silica material dispersed in a matrix material. The alumina-on-silica material is comprised of silica particles with surface bound aluminum groups chemically bonded to the silica surface through surface oxygen atoms, which material is dispersed in a matrix comprised of a refractory oxide, and wherein said material is prepared by: (i) coating silica particles with an aluminum compound capable of being thermally converted to an alumina surface phase under the conditions of (ii) and (iii) hereof; (ii) treating the coated silica material of (i) to a heat soak at a temperature from about 90° C. to about 300° C. for an effective amount of time; and (iii) calcining the aluminum coated silica material to form an alumina bound surface phase.

In a preferred embodiment, the silica of the alumina-on-silica material has a primary particle size within the range from about 10 Angstroms to about 1000 Angstroms, a maximum aggregate dimension in any direction within the range of about 0.01 microns to about 100 microns and a surface area within the range from about 1 m$^2$/g to about 2000 m$^2$/g, and wherein the material is calcined at a temperature from about 300° C. to about 1000° C.

In another preferred embodiments of the present invention, the silica of the alumina-on-silica material is a fumed silica or silica gel; the matrix material is selected from silica, alumina, and silica-alumina such that the weight percent of alumina-on-silica to matrix is about 10 to 90; and the fluid catalytic cracking conditions in a temperature from about 750° F. to about 1300° F. and a pressure from about 0 to 45 psig.

In other preferred embodiments of the present invention, a zeolite material, preferably a faujasite, is also present in the composite.

DETAILED DESCRIPTION OF THE INVENTION

As indicated supra, the present invention relates to a fluid catalytic cracking process utilizing an improved catalyst composite comprised of an alumina-on-silica additive material, a matrix material, and optionally a zeolite material. The alumina-on-silica material is prepared by coating silica with a suitable aluminum compound and thereafter converting the aluminum compound to a surface bound alumina phase. The acid activity of this alumina phase may be controlled by controlling the temperature at which the catalyst is ultimately calcined as well as adjusting the aluminum content relative to the surface area.

In general, the alumina-on-silica material of this invention, which is amorphous, may be prepared with essentially any form of silica having a maximum dimension in any direction from about 10 to about 1,000,000 Angstroms (100 micrometers), preferably from about 10 to about 100 Angstroms, and a surface area within the range from about 1 to about 2000 m$^2$g, preferably from about 90 to about 1000 m$^2$/g. Suitable silicas for use in the alumina-on-silica material include fumed silicas, precipitated silicas, various silica gels, and colloidal silicas. The alumina-on-silica material will, however, be most active, without regard to molecular size, when the same is prepared with a relatively small particle size silica containing mainly external surface area or internal surface area in large pores. For this reason, then, preparation with a fumed silica and/or silica gel is preferred.

As previously mentioned, the alumina-on-silica component is prepared by coating the silica with an aluminum compound and thereafter converting the aluminum compound to an alumina surface phase. As a result of the conversion, the alumina will become bonded to the silica through oxygen atoms thereby leaving aluminum bearing a formal negative charge on the surface of the silica. Conversion of the aluminum compound to a surface bound alumina phase is, then, accomplished such that these negative charges are balanced with hydrogen cations to create acid sites on the surface of the alumina-on-silica material. Since the acidic sites are on the surface of the silica, these sites will be readily accessible to any feedstock sought to be converted therewith.

In general, any aluminum compound that can be thermally converted to an alumina surface phase such that hydrogen cations are at least the predominant ion balancing the negative charge created by the reaction of the aluminum compound with the silica may be used to coat the silica in preparing the catalyst of this invention. Suitable aluminum compounds, organoaluminum compounds, and complexes, as well as inorganic aluminum compounds may be used. In general, the suitable aluminum compounds may be coated onto the silica either from solution, or in a liquid form such as in a molten form. In general, the organoaluminum compounds and complexes will, when heated to modest temperatures, attach to the silica surface, and, when heated to a calcining temperature, decompose to form a surface bound alumina phase in such a way that hydrogen cations are the predominant ion balancing the negative charge on aluminum caused by the reaction. High melting inorganic aluminum compounds, on the other hand, must generally be converted to a surface bound alumina phase via hydrothermoconversion to insure contact between the aluminum compound and the silica surface.

Further, low melting inorganic aluminum compounds will, generally, be converted to a surface bound alumina phase by hydrothermo-conversion, or, when heated to modest temperatures in physical admixture with the silica, attach to the silica surface and, when heated to calcining temperatures, decompose to form a surface bound alumina phase in such a way that hydrogen cations are the predominant ion balancing the negative charge on aluminum caused by the reaction.

Suitable organoaluminum complexes useful in preparation of the catalyst of this invention include those in which aluminum is coordinated to an oxygen atom of a chelating agent, such as acetyl acetone, dipivaloylmethane, and ethylene diammine tetraacetic acid, or to an oxygen atom and a heteroatom, such as 8-hydorxyquinoline. Other suitable organoaluminum complexes are described in Kirk-Othemer, ENCYCLOPEDIA OF CHEMICAL TECHNOLOGY, John Wiley and Sons, Wiley-Interscience Publication, Vol. 5, pp. 339-367 (1979, Third Edition). Suitable organoaluminum compounds include aluminum alkoxides, particularly aluminum alkoxides containing from 1 to about 18 carbon atoms, such as aluminum isopropoxide, aluminum s-butoxide and the like, and aluminum carboxylates, particularly aluminum carboxylates having from 1 to about 18 carbon atoms, such as aluminum butyrate, aluminum decanoate, aluminum stearate and the like. Suitable high melting inorganic aluminum compounds include aluminum sulfate, aluminum chlorhydrate, and colloidal alumina. Suitable low melting inorganic aluminum compounds include aluminum nitrate and aluminum halides (except for aluminum fluoride).

As indicated supra, the aluminum compound may be coated onto the silica either from solution or as a liquid such as in a molten phase. When an organoaluminum compound is employed, any organic solvent in which the organoaluminum compound will dissolve may be used. An organic solvent, as opposed to water, is used so as to avoid hydrolysis of the organoaluminum compound to an inorganic alumina precipitate which will not readily attach to the silica surface. Suitable organic solvents include alkanes such as hexane, heptane, octane and the like; alcohols such as propanol, isopropanol, butanol and the like; and aromatic hydrocarbons such as benzene, toluene, xylenes, cumene and the like. In general, and when a solvent is used, the aluminum compound will be dissolved in the solvent in an amount sufficient to provide from about 0.1 grams to about 15 grams of aluminum per liter of solvent. As is believed readily apparent, the amount of aluminum actually deposited onto the silica can be controlled by controlling the amount of aluminum in solution and the amount of solution actually used since after contacting the silica with the aluminum containing solution the solvent will, simply, be evaporated, depositing the aluminum compound onto the silica. When the aluminum compound is coated onto the silica from a liquid or molten phase, the amount of aluminum actually deposited on the silica will be controlled by controlling the amount of aluminum compound actually combined with the silica. When application from the molten phase is used, however, care should be exercised to avoid premature conversion of the aluminum compound to an alumina phase before aluminum attachment to the surface has occurred.

In general, coating of the silica with the aluminum compound will be controlled so as to provide from about 0.0025 mg to about 0.5 mg of aluminum per square meter of surface area of the silica. The thus coated silica will, generally, contain from about 0.01 wt. % to about 20 wt. % aluminum, preferably 1 to 12 wt. % aluminum, and more preferably 2 to 8 wt. % aluminum. Coating of the silica with the aluminum compound will be accomplished at a temperature within the range from about ambient temperature to about 400° C. and at a pressure within the range from about 0.1 mmHg to about 250 atmospheres.

When a solvent is used to deposit the aluminum compound onto the silica, the solvent will be distilled off and recovered for reuse. Again, care should be exercised in the selection of a solvent to insure that the solvent can be flashed, or distilled off, at temperatures below the temperature at which sublimation, or evaporation, of the aluminum compound will occur. Generally, solvents will be selected which can be flashed or distilled off at a temperature within the range from about −75° C. to about 200° C.

After the solvent has been flashed or distilled off, or after the aluminum compound has been deposited has been deposited on the silica, when a solvent is not used, the next step in the alumina-on-silica preparation is a mild heat soak at temperatures within the range of about 50° C. to about 300° C., preferably from about 75° C. to about 250° C., and more preferably from about 100° C. to 200° C., for a time within the range from about 1 to about 24 hours, to ensure complete attachment of the aluminum compound to the silica surface. The material is then calcined at a temperature within the range from about 300° C. to about 1000° C. When the alumina-on-silica material is calcined at lower temperatures within this range, the acid sites will be predominantly of the Bronsted acid type. When calcined at higher temperatures within this range, the acid sites will be predominantly of the Lewis type. At intermediate temperatures within this range, the acid sites will be a mixture of Bronsted and Lewis types. During calcination, the aluminum compound will be converted to a surface bound alumina phase. The calcination may be accomplished in an inert atmosphere, such as in nitrogen, or in an atmosphere of air or pure oxygen.

The hydrogen ion will be the predominant positively charged ion balancing the negatively charged aluminum ion created as a result of the conversion of the aluminum compound to a surface bound alumina phase. Calcination will, of course, also liberate any volatile components. Thus, compositions made in organic solvents with organoaluminum compounds are, in general, heated from ambient temperature to the calcination temperature under an inert atmosphere so as to avoid overheating that might result from combustion of volatile organic components prior to switching to air or oxygen once the calcination temperature is reached.

In the preferred embodiment of the present invention, an aluminum alkoxide will be used to coat a fumed silica at an aluminum loading within the range from about 0.02 to about 0.2 mg Al/m$^2$ SiO$_2$ surface area. In the most preferred embodiment of the present invention, aluminum isopropoxide will be used to coat a fumed silica. In both the preferred and most preferred embodiments, the aluminum alkoxide will be dissolved in an aromatic solvent, most preferably toluene. In both the preferred and most preferred embodiments, the aluminum alkoxide will be dissolved in the aromatic solvent at a concentration sufficient to provide from about 0.4 to about 10.0 grams of aluminum per liter of solvent. Fumed silicas are, of course, well known in the prior art and are available commercially. One such fumed silica, which is particularly useful in the catalyst of the present invention, is available from Cabot Corporation under the trademark Cab-O-Sil. This particular fumed silica, an average, has a primary particle size within the range from about 70 to about 240 Angstroms and a surface area generally within the range from about 90 to about 380 m$^2$/g. In both the preferred and most preferred embodiments, from about 10 to about 20 milliliters of aluminum alkoxide solution will be combined with each gram of fumed silica and after contacting, the aromatic solvent will be distilled off at a temperature within the range from about 30° C. to about 90° C. at a reduced pressure within the range from about 380 to about 1 mmHg. After the solvent has been distilled off, the aluminum coated silica will be heated in a vacuum oven at a temperature within the range from about 90° C. to about 300° C., preferably no more than about 200° C. for a time within the range from about 12 to about 20 hours, and then calcined at a temperature within the range from about 400° C. to about 900° C. Calcining within this temperature range will result in the production of acid sites, which are, apparently, more active than acid sites produced at temperatures outside this temperature range. The aluminum coated silica will be held at the calcining conditions for a nominal holding time within the range from about 15 to 600 minutes, more preferably 60 to 240 minutes. In both the preferred and most preferred embodiments, the alumina-on-silica will contain from about 4 to about 200 milligrams of aluminum per gram of fumed silica.

The matrix material used in the preparation of the catalysts of this invention can be either inert or active. It is preferred that the matrix material be an inorganic oxide. Inorganic oxide materials suitable for use herein include amorphous catalytic inorganic oxides, such as silica, alumina, silica-alumina, silica-zirconia, silica-magnesia, alumina-boria, alumina-titania and the like and mixtures thereof. Preferably, the inorganic oxide matrix is selected from alumina, silica and silica-alumina. By silica-alumina we mean a mixture of alumina and silica and not the alumina-on-silica additive of this invention. These materials, which are exclusive of the alumina-on-silica component, are generally prepared as a cogel of silica and alumina or as alumina precipitated on a preformed and preaged hydrogel. In general, the silica is present as a major component in the catalytic solids present in said gels, being present in amounts ranging from about 55 to 100 weight percent; preferably from about 70 to about 90 weight percent. Particularly preferred are two cogels, one comprising about 75 weight percent silica and 25 weight percent alumina and the other comprising about 87 weight percent silica and 13 weight percent alumina. The inorganic oxide matrix component may suitably be present in the catalyst of the present invention in an amount ranging from about 40 to about 99 weight percent, preferably from about 50 to about 80 weight percent, based on the total catalyst. It is also within the scope of this invention to incorporate other materials conventionally employed in cracking catalysts, such as various other types of zeolites, clays, carbon monoxide oxidation promoters, etc.

Zeolites which are suitable for use herein are the crystalline aluminosilicate materials having catalytic cracking activity. Such zeolite materials are described in U.S. Pat. No(s). 3,660,274 and 3,944,482, both of which are incorporated herein by reference. Non-limiting examples of such zeolites include both natural and synthetic zeolites. These zeolites include zeolites of the structural types included in the "Atlas of Zeolite Structural Types" edited by W. M. Meier and D. H. Olson and published in 1978 by the Structure Commission of the International Zeolite Association, which is also incorporated herein by reference. Preferred are the faujasites, specifically zeolite X, and zeolite Y. More preferred is zeolite Y, the structure of which is described in U.S. Pat. No. 3,120,017 which is also incorporated herein by reference. More preferred are Calcined Rare Earth Y zeolite (CREY) and Ultrastable Y zeolite (USY).

The zeolite may comprise rare earth metal cations and may additionally comprise hydrogen cations and cations of Group IB to VII metals of the Periodic Table of Elements. The Periodic Table referred to herein is illustrated in *Handbook of Chemistry and Physics*, published by the Chemical Rubber Company, Clevelend, Ohio, 45th Edition, 1964. When additional cations are present other than rare earth metals and alkali metals, the preferred additional cations are calcium, magnesium, hydrogen and mixtures thereof. The concentration of hydrogen present in the finished zeolites will be that concentration equivalent to the difference between the theoretical cation concentration of the particular zeolite in question and the amount of cation present in the form of, for example, rare earth and residual ion.

When the rare earth content and alkali metal of the catalyst are controlled by utilizing a zeolite which has been treated to comprise at least a portion of the required rare earth metal, for example, as rare earth metal cations, the zeolite having the desired rare earth metal component can be obtained by various methods.

One method of producing a required zeolite having only a limited amount of rare earth metal cations and low alkali metal content is to start with a sodium Y-type zeolite and ion exchange it with an ammonium ion by a conventional method known in the art, such as for example, by utilizing an ammonium salt in an aqueous or non-aqueous fluid medium. Ion exchange methods suitable for use herein are described in U.S. Pat. No. 3,140,249; U.S. Pat. No. 3,140,251; U.S. Pat. No. 3,140,253, the teachings of which are hereby incorporated by reference. Although a wide variety of salts can be employed, particular preference is given to chlorides, nitrates, and sulfates. The ion exchange treatment is conducted for a time sufficient to replace enough of the alkali metal cation by ammonium to decrease the alkali metal content of the zeolite to a desired value. The ammonium treatment may be a single treatment or a successive number of treatments. If desired, the treated zeolite can be washed between successive ammonium treatments. The resulting ammonium exchanged zeolite is recovered, for example, by filtration. The recovered zeolite is washed with water to remove soluble matter. The ammonium exchanged Y zeolite is contacted with a fluid medium comprising rare earth metal cations of a single rare earth metal or cations of a mixture of rare earth metals. The ion exchange is conducted in a conventional way, such as by utilizing salts of the desired rare earth metals. The rare earth metal treatment additionally replaces some of the remaining alkali metal cations of the zeolite and may replace some of the ammonium ions.

The amount of rare earth metal used is such that it does not exceed the limits of the range required for the catalyst of the present invention. The total amount of required rare earth may be exchanged into the zeolite itself or only a portion of the amount required by the catalyst of the present invention may be exchanged into the zeolite and the balance of the desired required amount may be composited with the finished catalyst, for example, by post-treating the finished catalyst with a solution comprising rare earth metal components that become associated with the finished catalyst.

The rare earth-exchanged zeolite can be recovered by filtration, and washed with water to remove soluble matter and calcined, for example, at a temperature ranging from about 1300° F. to 1600° F. for about 0.5 to 6 hours, preferably from about 1400° F. to 1500° F. for about 1 to 3 hours in the absence or in the presence of $H_2O$ which may be steam or water.

Ultrastable Y-type zeolites are described in U.S. Pat. Reissue No. 38,629 (Reissue of U.S. Pat. No. 3,402,996); 4,036,739; and 3,781,199 all of which are incorporated herein by reference. In general, "ultrastable" with reference to Y-type zeolite refers to a zeolite which is resistant to degradation of crystallinity by high temperature and steam treatment and which has a unit cell size not greater than about 24.5 Angstroms and a low alkali metal content. The silica to alumina mole ratio of Ultrastable Y-type zeolite is at least about 3:1.

The final zeolite may be composited with other catalytic metal components, such as metals of Groups IIA, IIIA, IVA, IB, IIB, IIIB, IVB, VIB, and VIII of the Periodic Table of Elements.

The particle size of the zeolite component will generally range from about 0.1 to 10 microns, preferably from about 0.5 to 3 microns. Suitable amounts of the zeolite component in the total catalyst will range from about 1 to 60, preferably from about 1 to 40, more preferably from about 5 to 40, most preferably from about 8 to 35 weight percent, based on the total catalyst.

The catalyst composites of the present invention can be prepared by blending the components in any sequence although it is preferred to start with the matrix material and blend in the other components. For example, if a composite is prepared without the zeolitic material, then the alumina-on-silica component is merely blended with the matrix material such that from about 10 to 90 wt. %, preferably about 20 to 70 wt. % of the matrix material is present. If the matrix material is a silica-alumina material, then it is preferred to react sodium silicate with a solution of aluminum sulfate to form a silica-alumina hydrogel slurry which is then aged to give the desired pore properties, filtered to remove extraneous sodium and sulfate ions and then reslurried in water.

The resulting mixture, or slurry, is then spray dried to produce dried solids. The dried solids are subsequently reslurried in water and washed substantially free of undesired soluble salts. The catalyst is then dried to a residual water content of less than about 15 wt. % and recovered.

Any conventional FCC process conditions may be used in the practice of the present invention. Typical catalytic cracking conditions include a temperature ranging from about 750 to 1300° F., a pressure ranging from about 0 to about 150 psig, typically from about 0 to about 45 psig. Suitable catalyst to oil weight ratios in the cracking zone used to convert the feed to lower boiling products are not more than about 20:1, and may range from about 20:1 to 2:1, preferably from 4:1 to 9:1. The catalytic cracking process may be carried out in a fixed bed, moving bed, ebullated bed, slurry, transfer line (dispersed phase) or fluidized bed operation. Suitable regeneration temperatures include a temperature ranging from about 1100 to about 1500° F., and a pressure ranging from about 0 to about 150 psig. The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

Suitable hydrocarbonaceous feeds for the catalytic cracking process of the present invention include naphtha, hydrocarbonaceous oils boiling in the range of about 430° F. to about 1050° F., such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, and mixtures thereof.

Having thus described the present invention and a preferred and most preferred embodiment thereof, it is believed that the same will become even more apparent by reference to the following examples. It will be appreciated, however, that the examples are presented for illustrative purposes and should not be construed as limiting the invention.

EXAMPLES

Catalysts of this invention and comparative catalysts were tested for cracking activity in a standard microactivity test (MAT) as described in the *Oil and Gas Journal*, 1966 Vol. 64, pages 7, 84, 85 and Nov. 22, 1971, pages 60–68.

EXAMPLE 1

In this example, an alumina-on-silica material was prepared by first coating a fumed silica (Cab-O-Sil, M-5 grade) with a toluene solution of aluminum isopropoxide and thereafter evaporating the toluene and then calcining the coated silica. The material was prepared by placing 48.8 g of dried silica, 11.08 g of aluminum isopropoxide, and 1000 ml dried toluene in a 2000 ml round bottom flask. The resulting mixture was then heated to 40° C. initially at reduced pressure to distill off the bulk of the solvent, and then to 80° C. to distill off the residual solvent. The relatively dry solid was heated overnight in a nitrogen purged vacuum oven at 100° C. and reduced pressure. The material was placed in a programmable furnace at ambient temperature and heated to 800° C. under nitrogen, then held at 800° C. for 60 min under air. Both nitrogen and air were used at ambient pressure. During heating and calcination, the aluminum isopropoxide became attached to the silica surface (aluminum isopropoxide normally sublimes at 100° C. under reduced pressure) and thermally decomposed to a surface bound alumina phase with liberation of the hydrocarbyl groups of the aluminum isopropoxide. The resulting material contained 2.8 wt. % aluminum, 42.1 wt. % silicon, and 0.04 wt. % carbon. The fumed silica used in preparing this material was reported by the manufacturer to have a primary particle size of about 140 angstroms and a surface area of about 200 m$^2$/g. The resulting alumina-on-silica material is referred to herein as Additive #1.

EXAMPLE 2

Another alumina-on-silica material was prepared as in Example 1 above except that 49.5 g of dried silica and 37.06 g of alumina isopropoxide were used. The resulting material, referred to herein as Additive #2, contained 9.34 wt. % aluminum, 40.4 wt. % silicon, and less than 0.01 wt. % carbon. The material of this example had a surface area of 197 m$^2$/g.

EXAMPLE 3

In this example, another alumina-on-silica material was prepared by first coating a silica gel (Davison) with a toluene solution of aluminum isopropoxide and thereafter evaporating the toluene and then calcining the coated silica. The material was prepared by placing 53.4 g of dried silica, 14.22 g of aluminum isopropoxide, and 1000 ml dried toluene in a 2000 ml round bottom flask. The resulting mixture was then heated to 40–50° C. initially at reduced pressure to distill off the bulk of the solvent, and then to 90° C. to distill off the residual solvent. The relatively dry solid was heated overnight in a nitrogen purged vacuum oven at 100° C. and reduced pressure. The material was placed in a programmable furnace at ambient pressure and heated to 400° C. under nitrogen, held for 15 min under nitrogen, then held at 400° C. for 60 min under air. Both nitrogen and air were used at ambient pressure. During heating and calcination, the aluminum isopropoxide became attached to the silica surface (aluminum isopropoxide normally sublimes at 100° C. under reduced pressure) and thermally decomposed to a surface bound alumina phase with liberation of the hydrocarbyl groups of the aluminum isopropoxide. The resulting material, referred to herein as Additive #3, contained 3.71 wt. % aluminum and 40.55 wt. % silicon. The silica used in preparing this material was reported by the manufacturer to have surface area of about 370 m²/g.

EXAMPLE 4

An alumina-on-silica material was prepared in accordance with the procedure set forth in Example 3 above except that 50.0 g of dried silica and 28.49 g of aluminum isopropoxide were used. The resulting material, referred to herein as Additive #4, contained 6.22 wt. % aluminum and 38.33 wt. % silicon.

EXAMPLE 5

An alumina-on-silica material was prepared in accordance with the procedure set forth in Example 3 above except that 55.1 g of dried silica and 46.34 g of aluminum isopropoxide were used. The resulting material, referred to herein as Additive #5, contained 8.87 wt. % aluminum and 36.16 wt. % silicon.

EXAMPLE 6

A reference Catalyst "A", not a catalyst of this invention, and two catalysts of this invention, "B" and "C", were prepared by the following method. USY zeolite (LZY-82 from Union Carbide) and the alumina-on-silica additives, as indicated in Table I below, were mixed into an amorphous silica-alumina gel. The mixture was then dried overnight at 250° F. The dried catalyst was then crushed to 150 mesh and washed three times with a 5% solution of $(NH_4)_2SO_4$. Following the washing the catalysts were dried overnight at 250° F. and calcined for 3 hours at 800° F. The finished catalysts were then steamed at 1400° F. for 16 hours under 1 atmosphere of steam pressure to simulate deactivation and equilibration in a commercial FCC regenerator. These catalysts were then evaluated using the MAT test for FCC catalysts as previously described.

TABLE I

| Catalyst | A | B | C |
|---|---|---|---|
| Composition | | | |
| Zeolite, Wt. % | 20 USY, | 20 USY, | 20 USY, |
| Matrix, Wt. % | 80 Silica-Alumina | 60 Silica-Alumina | 60 Silica-Alumina |
| Additive, Wt. % | 0 | 20 #1 | 20 #2 |
| MAT Results | | | |
| Conversion | | | |
| Wt. % 400° F. | 55 | 55 | 57 |
| Wt. % 650° F. | 74 | 75 | 74 |
| H₂ Yield, Wt. % | 0.02 | 0.02 | 0.02 |
| C Yield, Wt. % | 1.25 | 1.03 | 1.22 |

The above table shows that replacing part of the silica-alumina gel matrix with alumina-on-silica additive results in better conversion/coke yield selectivity in both cases.

For the catalyst prepared with Additive #1 containing 2.8 wt. % Al, coke yield was reduced while conversion to 400° F. products remained constant. For the catalyst prepared with Additive #2 containing 9.3 wt. % Al, conversion increased without an increase in coke yield.

Conversion to 650° F. products was also increased or remained constant as the silica-alumina gel matrix was replaced with alumina-on-silica additive.

These results are particularly noteworthy because the alumina-on-silica additives contain substantially less alumina (i.e., fewer cracking sites) than silica-alumina gel.

EXAMPLE 7

Catalysts D, E, and F, all catalysts of this invention, were prepared in a similar fashion as the catalysts described in Example 6, but using different alumina-on-silica additives. These catalysts were then evaluated using a MAT test for FCC catalysts.

TABLE II

| Catalyst | D | E | F |
|---|---|---|---|
| Composition | | | |
| Zeolite, Wt. % | 20 USY, | 20 USY, | 20 USY, |
| Matrix, Wt. % | 60 Silica-Alumina | 60 Silica-Alumina | 60 Silica-Alumina |
| Additive, Wt. % | 20 #3 | 20 #4 | 20 #5 |
| MAT Results | | | |
| Conversion | | | |
| Wt. % 400° F. | 57 | 57 | 56 |
| Wt. % 650° F. | 77 | 77 | 75 |
| H₂ Yield, Wt. % | 0.02 | 0.02 | 0.02 |
| C Yield, Wt. % | 1.25 | 1.05 | 1.23 |

The above table shows that replacing a portion of the silica-alumina matrix with an alumina-on-silica additive results in higher conversions to 400° F. and 640° F. products with no increase coke yields.

Coke yields were lowest for Catalyst E, containing Additive #4, a porous silica gel coated with 6.2 wt. % alumina. This appears to have been the optimum Al level for this alumina-on-silica because higher Al loadings of Additive #5, contained in Catalyst F, show reduced conversion while increasing coke yields.

EXAMPLE 8

Catalysts G and H were prepared in a similar fashion as the catalysts described in Example 6, but did not contain a zeolite component. Catalyst G is a reference catalyst and Catalyst H is a catalyst of this invention. These catalysts were then evaluated using a MAT test for FCC catalysts.

TABLE III

| Catalyst | G | H |
|---|---|---|
| Composition | | |
| Zeolite, Wt. % | None | None |
| Matrix, Wt. % | 100 Silica-Alumina | 80 Silica-Alumina |
| Additive, Wt. % | None | 20 #1 |
| MAT Results | | |
| Conversion | | |
| Wt. % 400° F. | 40 | 40 |
| Wt. % 650° F. | 66 | 66 |
| H₂ Yield, Wt. % | 0.02 | 0.02 |
| C Yield, Wt. % | 1.22 | 1.15 |

The table shows that incorporating 20 wt. % of Additive #1 in a silica alumina gel matrix results in lower coke yield at the same conversion to 400° F. and 640° F. products.

This is particularly noteworthy because the alumina-on-silica contains less alumina (i.e., fewer cracking sites) than silica-alumina gel.

EXAMPLE 9

Catalysts I and J were prepared in a similar fashion as the catalysts described in Example 6, but were prepared with a silica gel rather than a silica-alumina gel matrix. In addition these catalysts did not contain a zeolite component. Catalyst I is a reference catalyst and Catalyst J is a catalyst of this invention. These catalysts were then evaluated using a MAT test for FCC catalysts.

TABLE IV

| Catalyst | I | J |
|---|---|---|
| Composition | | |
| Zeolite, Wt. % | None | None |
| Matrix, Wt. % | 100 Silica | 80 Silica |
| Additive, Wt. % | None | 20 #1 |
| MAT Results | | |
| Conversion | | |
| Wt. % 400° F. | 4 | 10 |
| Wt. % 650° F. | 22 | 30 |
| $H_2$ Yield, Wt. % | 0.002 | 0.002 |
| C Yield, Wt. % | 0.36 | 0.52 |

The above table shows that incorporating 20 wt. % of Additive #1 in an "inert" silica gel matrix results in increased conversion to 400° F. and 640° F. products, with only a small increase in coke yield.

EXAMPLE 10

A reference Catalyst K, not a catalyst of this invention, and a catalyst of this invention, L, were prepared in a similar fashion as the catalysts described in Example 6, but using a silica gel matrix. These catalysts were then evaluated using the MAT test for FCC catalysts.

TABLE V

| Catalyst | K | L |
|---|---|---|
| Composition | | |
| Zeolite, Wt. % | 20 USY | 20 USY |
| Matrix, Wt. % | 80 Silica | 60 Silica |
| Additive, Wt. % | None | 20 #1 |
| MAT Results | | |
| Conversion | | |
| Wt. % 400° F. | 42 | 45 |
| Wt. % 650° F. | 67 | 71 |
| $H_2$ Yield, Wt. % | 0.025 | 0.016 |
| C Yield, Wt. % | 0.95 | 1.08 |

The above table shows replacing a portion of a silica gel matrix with Additive #1, in a USY zeolite containing composite catalyst, results in higher conversion to 400° F. and 640° F. products, with only a small increase in coke yield.

EXAMPLE 11

A reference Catalyst M, not a catalyst of this invention, and a catalyst of this invention, N, were prepared in a similar fashion as the catalysts described in Example 6, but using a silica gel matrix and a CREY zeolite from Davison. These catalysts were then evaluated using the MAT test for FCC catalysts.

TABLE VI

| Catalyst | M | N |
|---|---|---|
| Composition | | |
| Zeolite, Wt. % | 20 CREY | 20 CREY |
| Matrix, Wt. % | 80 Silica | 60 Silica |
| Additive, Wt. % | None | 20 #1 |
| MAT Results | | |
| Conversion | | |
| Wt. % 400° F. | 46 | 66 |
| Wt. % 650° F. | 67 | 89 |
| $H_2$ Yield, Wt. % | 0.006 | 0.007 |
| C Yield, Wt. % | 1.79 | 2.17 |

The above table shows replacing a portion of a silica gel matrix with Additive #1, in a CREY zeolite containing composite catalyst, results in substantially higher conversion to 400° F. and 640° F. products, with only a small increase in coke yield.

COMPARATIVE EXAMPLE AND EXAMPLE 12

In this example, two alumina-on-silica samples were prepared by first coating a fumed silica (Cab-O-Sil, M-5 grade) with a toluene solution of aluminum isopropoxide, thereafter evaporating the toluene, and then calcining the alumina coated silica. Each of the samples was prepared by placing 51 g. of dried silica, 11.58 g. of aluminum isopropoxide, and 1000 ml dried toluene in a 2000 ml round bottom flask. The toluene was then removed at reduced pressure. Each sample was placed in a programmable furnace at ambient temperature and heated to 800° C. under nitrogen, then held at 800° C. for 60 mins. under air. Prior to this heat treatment, Sample B was subjected to a heat soak at 100° C. overnight (about 16 hours). Both nitrogen and air were used at ambient pressure. During preparation of this Sample B, the aluminum isopropoxide became attached to the silica surface (aluminum isopropoxide normally sublimes) and thermally decomposed to a surface bound alumina phase with liberation of the hydrocarbyl groups of the aluminum isopropoxide. Both of samples A, which represent the Comparative Example, contained 3.24 wt. % aluminum, and Sample B contained 3.29 wt. % aluminum. The fumed silica used in preparing these samples were reported by the manufacturer to have a primary particle size of about 140 angstroms and a surface area of about 200 $m^2/g$. The resulting alumina-on-silica material of Samples A had a measured surface area of 195 $m^2/g$. The resulting alumina-on-silica material of Samples A had a measured surface area of 195 $m^2/g$, which is substantially the same as the starting fumed silica material. The surface area of the resulting alumina-on-silica material for Sample B was not measured, but it is expected to also be substantially the same as the fumed silica material.

Each sample (two runs were made with Sample A) was evaluated by measuring conversion of the model compound cumene to primarily benzene and dipropylbenzenes. The evaluation was carried out in a batch reactor under autogenous cumene pressure at conditions of 650° F. for 60 minutes with agitation. The results obtained are shown in the table below.

| Sample | Al Content | PPM Al on Cumene | Cumene Conversion |
|---|---|---|---|
| A (Run 1) | 3.24 | 303 | 5.5 |
| A (Run 2) | 3.24 | 308 | 3.7 |
| B | 3.29 | 297 | 38.0 |

The above table illustrates the importance of subjecting the alumina-on-silica material of the instant invention to a heat soak prior to calcination. As is evidenced in the table, the conversion activity for the sample which was subjected to a heat soak is substantially greater than the one that was not.

What is claimed is:

1. A fluid catalytic cracking process which comprises contacting, at fluid catalytic cracking conditions, a hydrocarbonaceous feed with a catalyst composite comprised of an alumina-on-silica material, which material is comprised of silica particles with surface bound aluminum groups chemically bonded to the silica surface through surface oxygen atoms, which material is dispersed in a matrix comprised of a refractory oxide, and wherein said material is prepared by: (i) coating silica particles with an aluminum compound capable of being thermally converted to an alumina surface phase under the conditions of (ii) and (iii) hereof; (ii) treating the coated silica material of (i) to a heat soak at a temperature from about 90° C. to about 300° C. for a period lasting from about 12 hours to about 20 hours and (iii) calcining the alumina coated silica material to form an alumina bound surface phase.

2. The process of claim 1 wherein the fluid catalytic cracking conditions include a temperature from about 740° F. to about 1300° F. and a pressure from about 0 to 45 psig.

3. The process of claim 2 wherein the silica of the alumina-on-silica material has a primary particle size within the range from about 10 Angstroms to about 1000 Angstroms, a maximum aggregate dimension in any direction within the range of about 0.01 microns to about 100 microns and a surface area within the range from about 1 $m^2/g$ to about 2000 $m^2/g$, and wherein the material is calcined at a temperature from about 300° C. to about 1000° C.

4. The process of claim 3 wherein the silica of the alumina-on-silica material is selected from the group consisting of fumed silica, a precipitated silica, a silica gel, and colloidal silica.

5. The process of claim 4 wherein the silica is a fumed silica or a silica gel.

6. The process of claim 1 wherein the matrix is selected from alumina, silica and a silica-alumina.

7. The process of claim 5 wherein the matrix selected from alumina, silica and silica-alumina.

8. The process of claim 1 wherein said alumina is coated onto said silica such that said alumina-on-silica material is comprised of about 0.01 to about 20% wt. % aluminum.

9. The process of claim 7 wherein said alumina is coated onto said silica such that said alumina-on-silica material is comprised of about 0.01 to about 20 wt. % aluminum.

10. The process of claim 1 wherein the weight percent of the alumina-on-silica component is about 10 to 90 based on the total weight of the composite.

11. The process of claim 9 wherein the weight percent of the alumina-on-silica component to matrix component is about 10 to 90.

12. The process of claim 1 wherein a zeolite material is also present.

13. The process of claim 11 wherein a zeolite material is also present.

14. The process of claim 1 wherein the zeolite material is a faujasite.

15. The process of claim 13 wherein the zeolite material is a faujasite.

16. The process of claim 15 wherein the faujasite material is a Y zeolite selected from rare earth Y and ultrastable Y.

* * * * *